June 15, 1954  I. V. K. HOTT ET AL  2,681,077
ACTUATING APPARATUS FOR PLURAL VALVES
CONTROLLING VEHICLE LIFTS
Filed Sept. 29, 1948  8 Sheets-Sheet 1
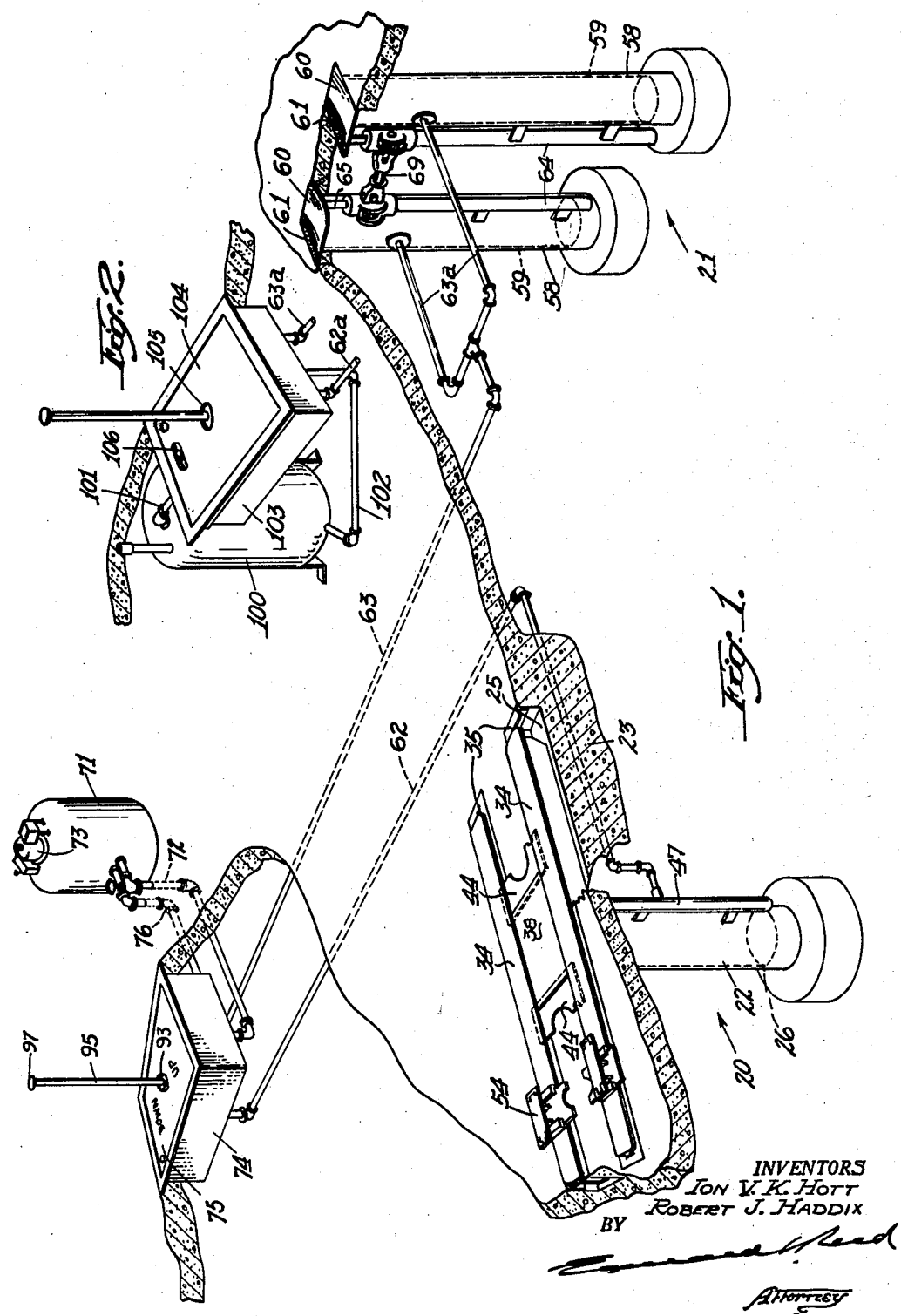
INVENTORS
ION V. K. HOTT
ROBERT J. HADDIX
BY
Attorney

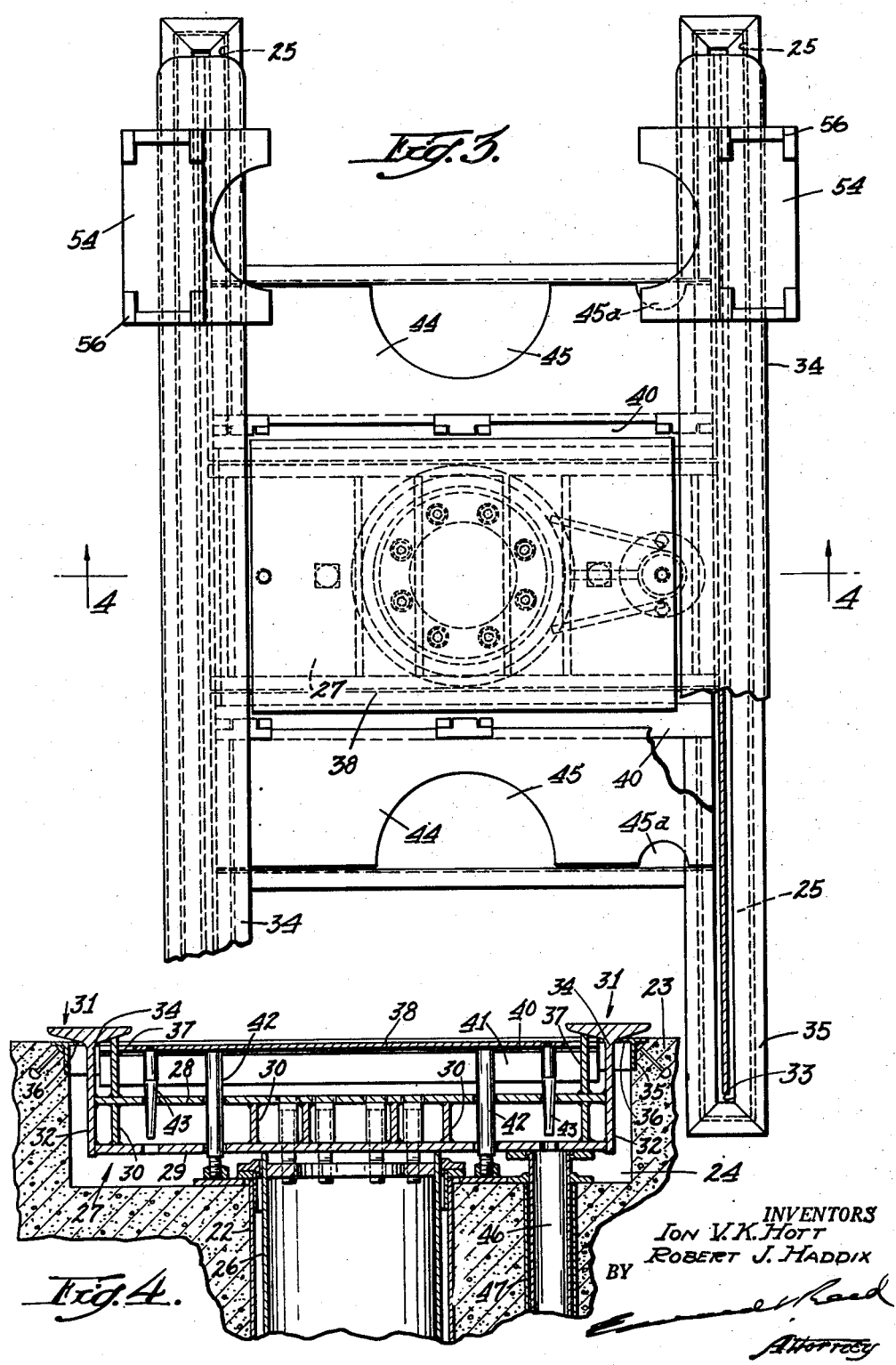

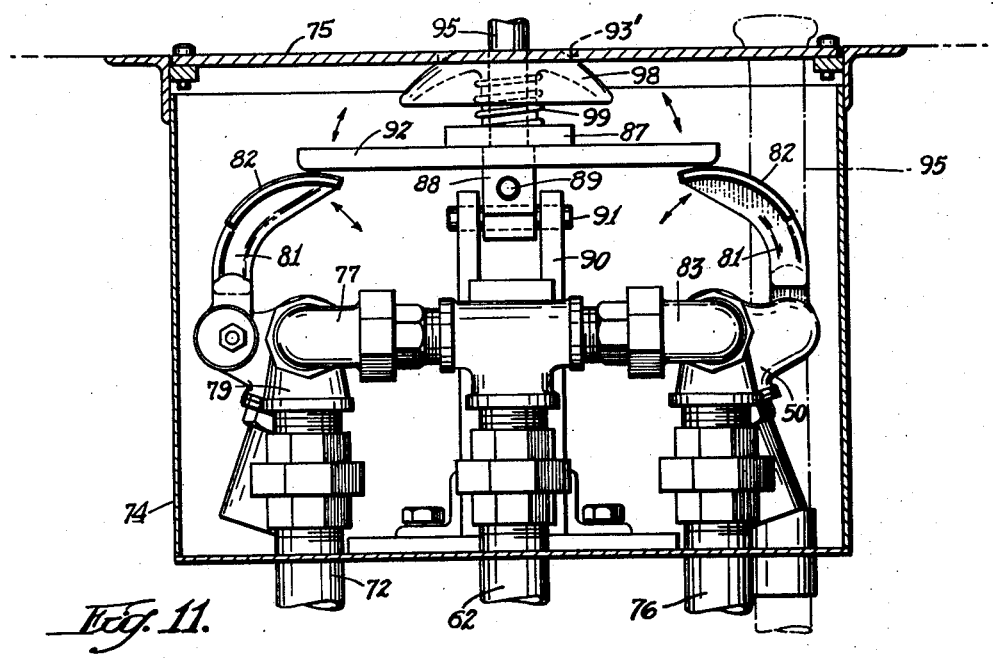
Fig. 11.
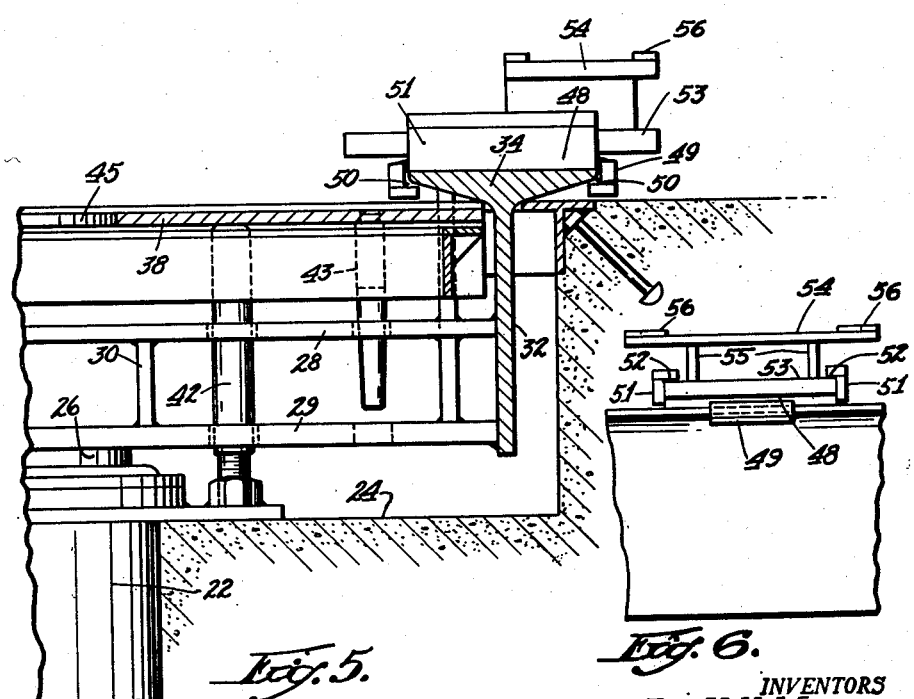
Fig. 5.
Fig. 6.
INVENTORS
ION V. K. HOTT
ROBERT J. HADDIX
BY

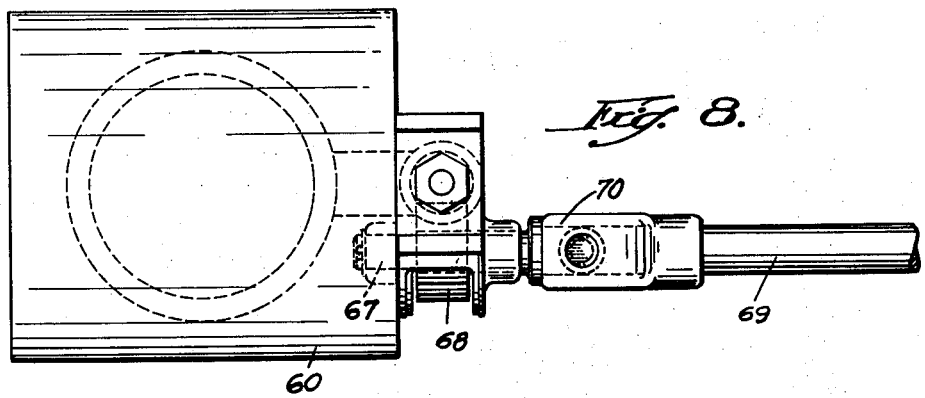
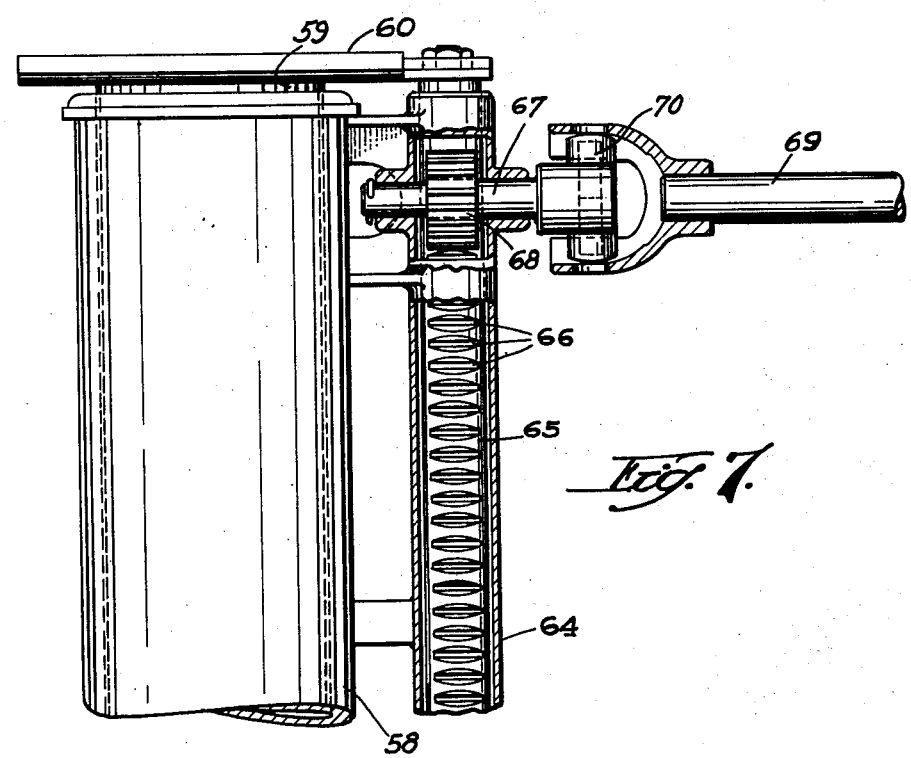

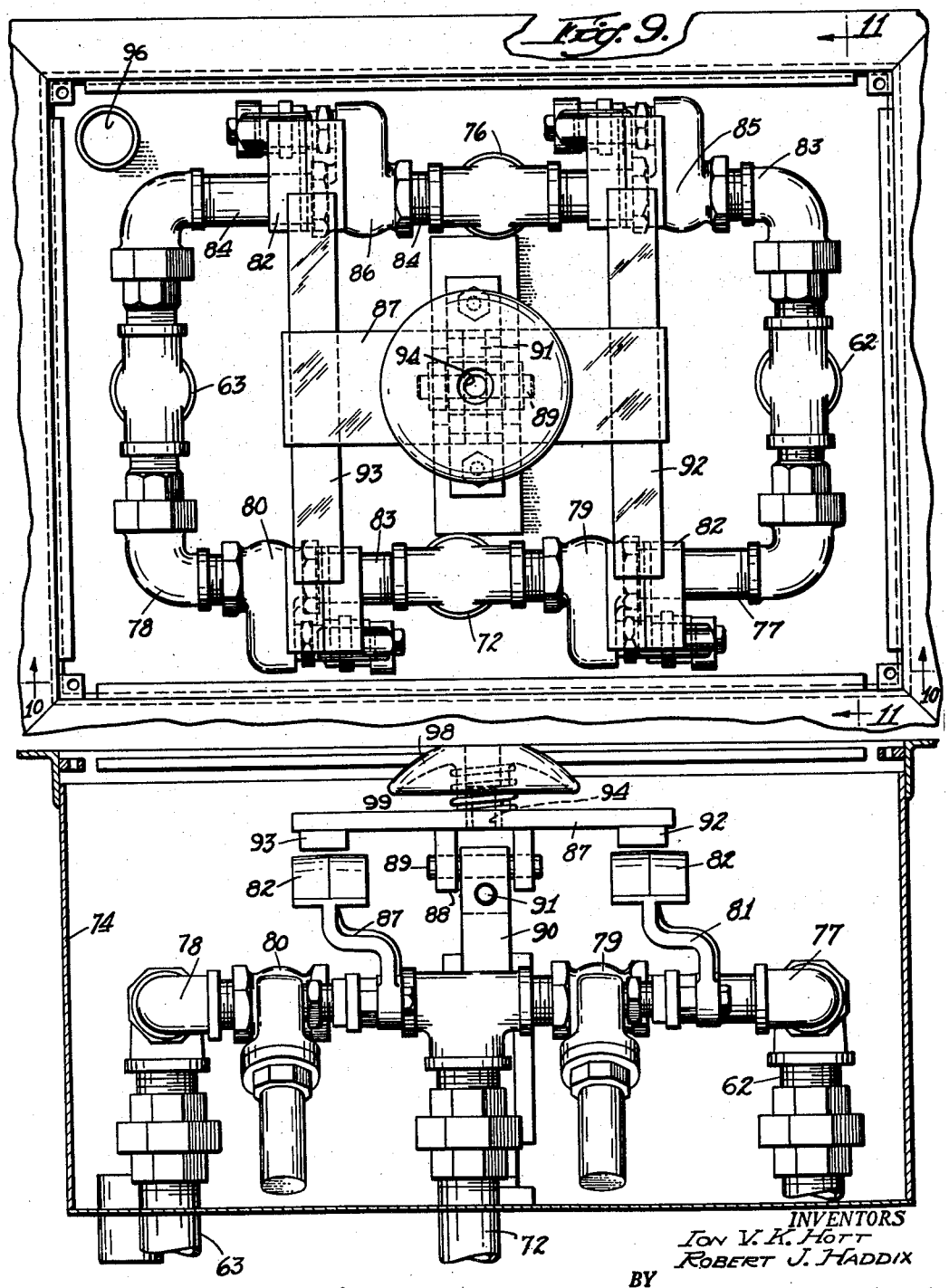

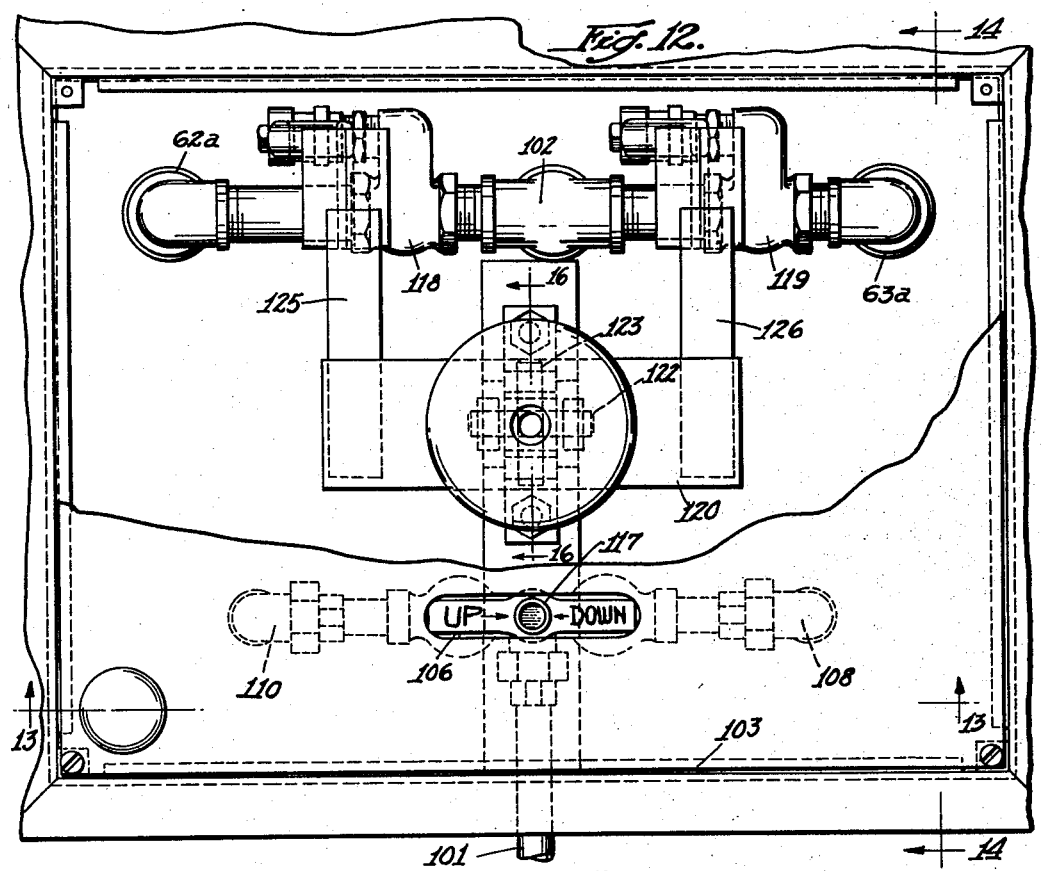
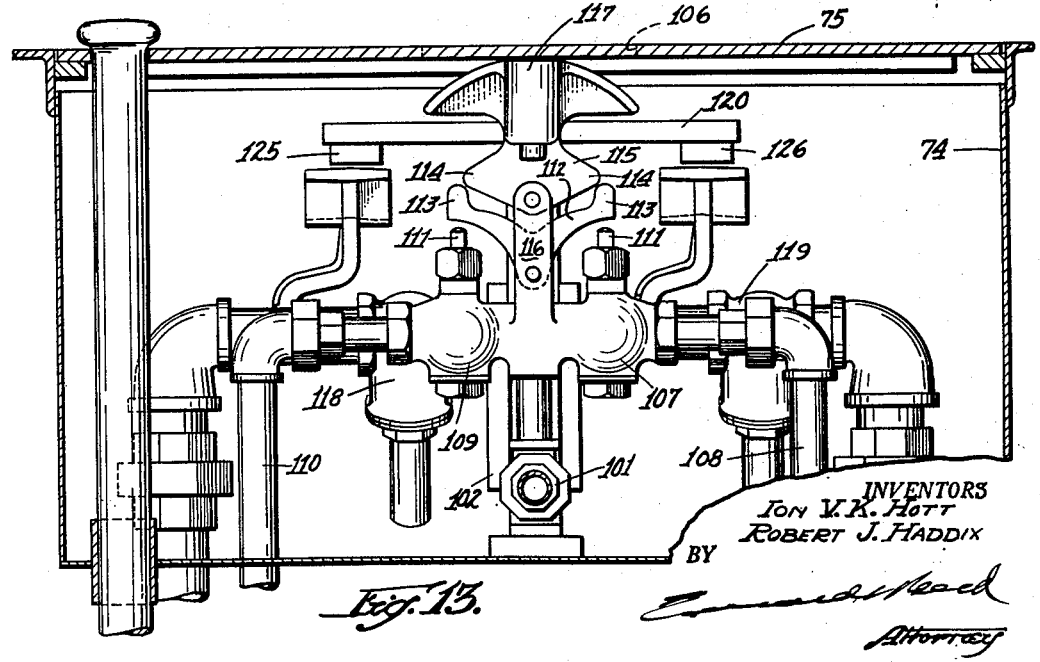

INVENTORS
ION V. K. HOTT
ROBERT J. HADDIX
BY
Attorney

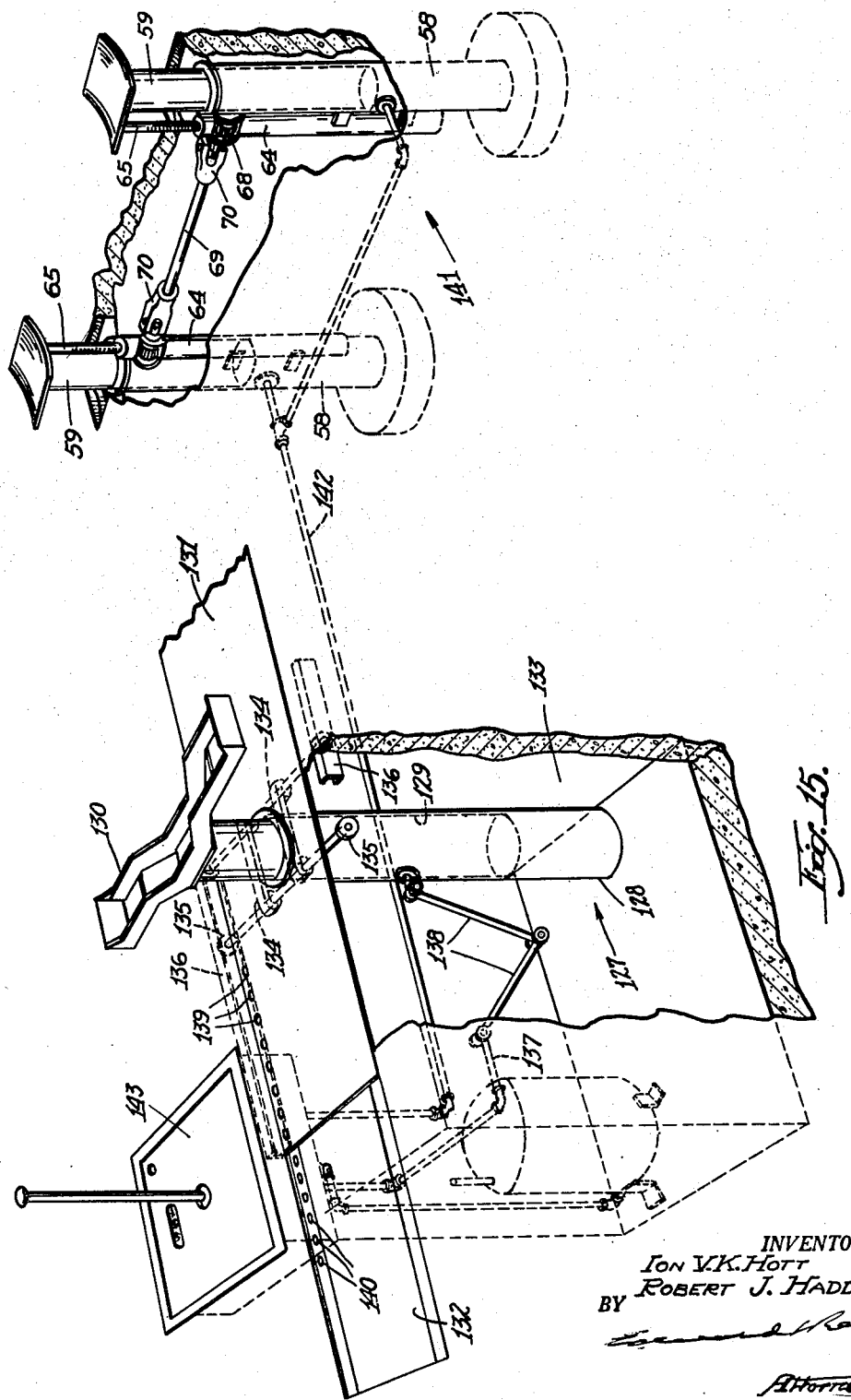

Patented June 15, 1954

2,681,077

UNITED STATES PATENT OFFICE 2,681,077

ACTUATING APPARATUS FOR PLURAL VALVES CONTROLLING VEHICLE LIFTS

Ion V. K. Hott and Robert J. Haddix, Dayton, Ohio, assignors to The Joyce-Cridland Company, Dayton, Ohio, a corporation of Ohio Application September 29, 1948, Serial No. 51,668

13 Claims. (Cl. 137—636)

This invention relates to vehicle lifts and more particularly to multipost lifts for busses, trucks and other vehicles.

One object of the invention is to provide a vehicle lift of such a character and so installed in a floor that when the lift is not in use the floor will be free from obstructions or openings which would materially restrict the use of the floor or render that use hazardous.

It has been proposed heretofore to provide such a vehicle lift but the lifts so provided have either been unsatisfactory in operation or the construction and installation thereof have resulted in a substantially increased expense. It is therefore a further object of the invention to provide such a lift which can be produced and installed at a relatively low cost and will be entirely satisfactory in operation.

A further object of the invention is to provide a lifting mechanism having a superstructure of the rail type in which the heads of the rails are in contact with the floor when in their lowermost positions and in which removable axle engaging devices may be mounted on the rail heads and adjusted with relation thereto while said rails are in said lowermost positions.

A further object of the invention is to provide a vehicle lifting unit comprising a pair of fluid operated lifting elements to engage the respective ends of an axle of a vehicle and means for causing said lifting elements to move substantially in unison when they are subjected to loads of different weights.

A further object of the invention is to provide improved means for controlling the supply of propellant fluid to the front and rear fluid operated lifting units of a multipost lift and for regulating the supply of fluid to the respective units to maintain the vehicle in a substantially horizontal position.

A further object of the invention is to provide a controlling device which can be installed below the floor surface and thus located in the position most satisfactory to the operator without constituting an obstruction on the floor.

Other objects of the invention may appear as the lift is described in detail.

Figure 14:
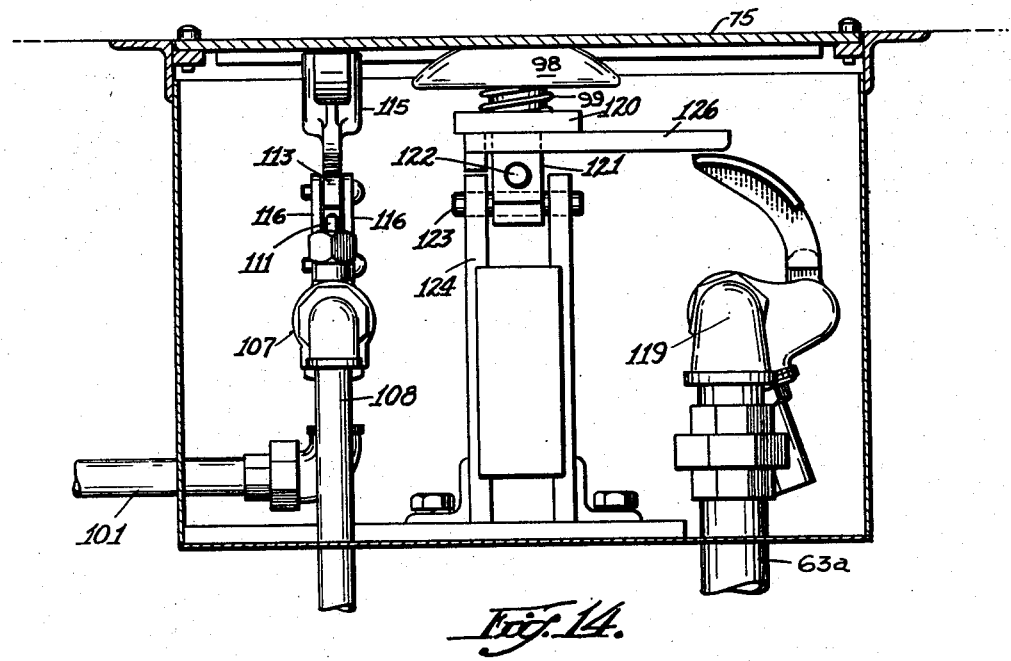
Figure 16:
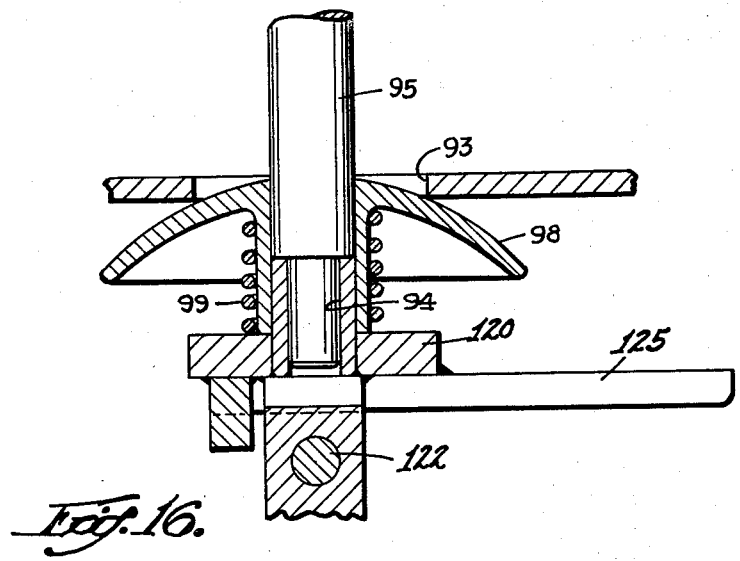

In the accompanying drawings Fig. 1 is a schematic view of a vehicle lift embodying our invention and provided with a pump operated supply tank; Fig. 2 is a perspective view of an air operated supply tank and a valve controlling mechanism for use therewith; Fig. 3 is a top plan view, partly broken away, of a rail type superstructure for a lifting mechanism; Fig. 4 is a section taken on the line 4—4 of Fig. 3; Fig. 5 is a sectional view on a larger scale of a portion of said superstructure showing the axle engaging device in elevation; Fig. 6 is a side elevation of the axle engaging device; Fig. 7 is an elevation, partly in section, of a portion of one lifting mechanism of a pair of lifting mechanisms, showing an equalizing device connected therewith; Fig. 8 is a top plan view of the device shown in Fig. 7; Fig. 9 is a top plan view of a device for controlling the flow of propellant fluid to two lifting units; Fig. 10 is a section taken on the line 10—10 of Fig. 9; Fig. 11 is a section taken on the line 11—11 of Fig. 9; Fig. 12 is a plan view of a modified form of control mechanism; Fig. 13 is a section taken on the line 13—13 of Fig. 12 showing the mechanism in side elevation; Fig. 14 is a section on the line 14—14 of Fig. 12 showing the mechanism in end elevation; Fig. 15 is a schematic view, partly in section, showing portions of the invention embodied in a vehicle lift of a different construction; and Fig. 16 is a detail sectional view on the line 16—16 of Fig. 12, of the connection between the valve controlling mechanism and its operating member.

In these drawings we have illustrated one embodiment of the invention, together with certain modifications thereof, and have shown the same as applied to a multipost lift, but it is to be understood that the lift as a whole, as well as the several parts thereof, may take various forms without departing from the spirit of the invention and that various novel features of the apparatus may be embodied in a single post lift.

In the embodiment illustrated in Fig. 1 of the drawings the invention is embodied in a multipost vehicle lift including a lifting unit 20 comprising a single lifting element and a second lifting unit 21 comprising two lifting mechanisms to support the respective end portions of an axle. The two lifting units are thus adapted to support respectively the front and rear axles of a vehicle. Either lifting unit may be the front unit and the other the rear unit but for the purpose of this description the unit 20 comprising a single lifting mechanism will be designated as the front lifting unit and the unit 21 comprising two lifting mechanisms will be designated as the rear lifting unit.

As shown in Figs. 1, 3 and 4, the front lifting unit 20 comprises a cylinder 22 supported below a shallow pit in the floor 23. The pit is open at its upper end and comprises a central portion 24 of substantial width and relatively narrow portions 25 at both sides of the larger portion and extending forwardly and rearwardly beyond the latter. The upper end of the cylinder 22 extends into the bottom of the larger portion 24 of the pit and is rigidly supported therein. Mounted in the cylinder 22 is a piston or lifting element 26 the upper end of which extends above the cylinder and is rigidly secured to a cross member 27 which is located in the larger portion of the pit and below the floor surface when the lifting element is in its lowermost position. The cross member is here shown as comprising upper and lower plates 28 and 29 spaced one from the other and rigidly connected by vertical ribs 30 rigidly secured thereto, as by welding. The thickness of the cross member is substantially less than the depth of the portion 24 of the pit and the upper plate 28 is therefore spaced substantially below the floor surface when the lifting element is in its lower position. Rigidly secured to the respective sides of the cross member 27 are rails 31, each rail comprising a relatively thin vertical web 32 adapted to move into and out of the narrow portions 25 of the pit through narrow openings or slots 33 in the floor, and a head 34 extending laterally beyond both sides of the web and of a width substantially greater than the width of the slot 33. Preferably the pit is provided along each side thereof with a metallic bar 35, partially embedded in the concrete of the floor and here shown as T-shaped in cross section, the inner flanges 36 of the bar at the respective sides of the narrow portions of the pit extending inwardly to form the narrow openings 33 and being spaced one from the other a distance slightly greater than the thickness of the webs 32. The flanges 36 extend along the sides of the larger portions of the pit and have engagement with the outer flanges only of the respective rail heads, the inner flanges being preferably braced by upright webs 37 rigidly secured to the cross member. When the cross member is in its lowermost position, as shown in Fig. 4 the thin portions 32 of the rails extend into the pit and the lower portions of the rail heads are in contact with the flanges 36, which form part of the floor surface, and remain above the floor surface, but these rail heads are of relatively thin construction, being usually less than an inch in thickness, so that they do not extend above the floor surface far enough to interfere with the movement of vehicles or persons over the floor surface when the lift is not in use.

Supported on the cross member 27 is a closure plate 38 which is slightly smaller in dimensions than the pit 24 and is adapted to be supported, when the cross member is in its lowermost position, on ledges 40 formed by angle bars 41 rigidly secured to the floor at the front and rear ends of the large portion of the pit, the ledges being spaced below the floor surface a distance approximating the thickness of the closure plate. The intermediate portion of the closure plate, when in this lower position, is supported by studs 42 mounted on the bottom of the pit 24 and extending through openings in the cross member. The closure plate is connected with the cross member by tapered studs 43 rigidly secured thereto and extending downwardly through openings in the upper plate of the cross member to hold the closure plate against lateral displacement with relation to the cross member. When the lifting element and cross member move upwardly the closure plate moves with the same and other means are provided for closing the top of the large portion 24 of the pit when the lifting element is in its elevated position and thus providing a substantially continuous floor surface under the elevated vehicle over which the operator may move in safety while servicing the vehicle, the openings 33 being so narrow as to present no hazard. As here shown this last mentioned closure comprises doors 44 which are hinged at their edges to the floor adjacent the front and rear ends of the wide portion of the pit and normally lie flat on the surface of those portions of the floor which are between the narrow portions of the pit, which are preferably slightly depressed to support the doors flush with the floor. Each door is provided in its free edge portion with an approximately semi-circular recess 45 of a diameter slightly greater than the diameter of the cylindrical lifting element so that after the lifting element has been elevated the doors may be swung into position over the open end of the pit. In the present arrangement the lifting element is provided with a downwardly extending tubular member 46 which slides in a guideway 47 parallel with the cylinder 22 to hold the lifting element against rotation, and the doors are provided with other recesses 45a to receive this member. Thus the floor is substantially continuous and unobstructed when the lifting element is in either its lowermost position or its elevated position.

Each of the rail heads is adapted to receive and support an axle engaging device which is adjustable lengthwise thereof to accommodate the same to vehicles having different wheel bases. These axle engaging devices are removably attached to the rail heads and may be removed therefrom when the lift is not in use, to avoid obstructions on the floor. They may take various forms but in the present instance each device comprises a base 48 adapted to rest upon the top surface of the rail head and having on each side of the rail head downwardly extending parts 49 having opposed channels 50 to receive the respective edge portions of the rail head. The rail head is of such shape that the lower surfaces of the lateral portions thereof are spaced from the floor surface a distance sufficient to permit the lower portions of the channeled members to extend between the same and the floor. In the present instance the lower surfaces of the lateral portions of each rail head are inclined upwardly and laterally. The base member 48 is also provided at its front and rear edges with upwardly extending parts 51 which extend transversely to the rail and have therein opposed channels 52. Slidably mounted in the channels 52 is an axle engaging member which preferably comprises a plate 53 slidably mounted in the channels 52 and of a length substantially greater than the width of the rail head. An upper rail engaging plate 54 is rigidly secured to the plate 53 by upright members 55 so that it is supported above and out of contact with the upwardly extending parts of the base. This upper plate 54 is provided adjacent the corners thereof with upwardly extending projections or lugs 56 to locate the same with relation to the axle. Thus when the lifts are to be used the rail engaging devices may be slipped onto the respective rails, at one end of the superstructure, and adjusted lengthwise of the latter to accommodate the same to the axle of the vehicle which is to be lifted before any upward movement has been imparted to the lifting mechanism.

The lifting unit 21 comprises two lifting mechanisms each of which includes a cylinder 58 supported below the floor surface and a piston or lifting element 59 movably supported in the cylinder, extending above the upper end thereof and provided at its upper end with a supporting element, such as a wheel engaging member 60, which is here shown as a plate curved to position the axle with relation thereto and adapted to enter a shallow recess 61 in the floor surface when the lifting element is in its lowermost position. Propellant fluid is supplied to the respective lifting units, 20 and 21, by conduits 62 and 63, the latter conduit being branched, as shown at 63a, to connect the same with both cylinders 58 of the unit 21. Thus propellant fluid is supplied to the two cylinders 58 simultaneously and at the same pressure. It may sometimes happen that the load on the lifting unit 21 will be unevenly divided between the lifting elements 59 and that the lifting element having the lighter load will tend to move upwardly at a speed greater than the speed at which the other lifting element moves. For the purpose of causing the lifting elements to move at substantially uniform speeds an equalizing device is interposed between the two lifting elements. As shown in Figs. 1, 7 and 8, upright tubular guides 64 are connected with the cylinders 58 on adjacent sides thereof and slidably mounted in each guide is a bar 65 provided with rack teeth 66 and rigidly connected at its upper end with the lifting element 59. Rotatably mounted on each guide 64 is a short shaft 67 to which is rigidly secured a pinion 68 which meshes with the toothed bar 65 and is thus rotated by the vertical movement of the lifting element. The adjacent ends of the two shafts 67 are connected one with the other for rotation in unison by a shaft 69 which is connected with the respective shafts 67 by universal joints 70. If one lifting element tends to move at a greater speed than the other the pinion connected with that lifting element will transmit its movement to the pinion connected with the other lifting element and a portion of the force exerted on the first mentioned lifting element will thus be transmitted to the second lifting element and the two lifting elements will thereby move at the same speed at all times regardless of any variation of the relative weights of the loads thereon.

The conduits 62 and 63 which supply propellant fluid to the two lifting units may be connected with any suitable source of fluid under pressure, a suitable controlling device being interposed between the source and the lifting units to control the flow of fluid of the latter, and thus control their movements. In the installation shown in Fig. 1 the source of fluid supply is a tank 71 from which the fluid is discharged through a conduit 72 by a pump within the tank, not shown, but driven by an electric motor 73 on the tank, this being a well known type of oil supply tank. Interposed between the conduit 72 and the two supply conduits 62 and 63 are controlling valves and an actuating device therefor. It is desirable that this controlling device should be located in a position where the operator can have a satisfactory view of the lifting units and of the vehicle thereon and this position is sometimes spaced a substantial distance from the fluid tank. It is also desirable that when so located the controlling device should be below floor level so as not to constitute an obstruction on the floor. In the present instance the control mechanism is mounted in a control box 74 which is mounted in the floor with its top wall 75 substantially flush with the floor surface, and the conduits which connect the control mechanism with the tank and with the lifting units are below the floor surface. The propellant fluid which is delivered by the pump is returned to the tank through a return conduit 76, when the lifting elements are lowered. In the particular mechanism here illustrated (Figs. 9 to 11) the conduits 62 and 63 enter the control box through the bottom wall thereof and the supply conduit 72 from the tank enters the control box adjacent one side thereof. A conduit 77 connects the supply conduit 72 with the conduit 62 leading to the front lifting unit 20, and a conduit 78 connects the supply pipe 72 with the conduit 63 leading to the rear lifting unit 21. The flow of the fluid through the conduits 77 and 78 is controlled by valves 79 and 80 interposed in the respective conduits. These valves may be of any suitable character but are preferably self-closing gate valves of a commercial type. Each valve includes an actuating element, such as a pivoted arm 81, the free end portion of which is provided with an arcuate contact surface 82. The fluid returns from the lifting units to the control mechanism through the conduits 62 and 63 and passes from those conduits through connecting conduits 83 and 84 to the return conduit 76, which is here shown as located adjacent that side of the control box opposite the supply conduit 72. The conduits 83 and 84 are also provided with self-closing valves 85 and 86 which may be identical with the valves 79 and 80.

Arranged in the control box is a valve actuating device which is operable from the exterior of the box to selectively operate the four valves. In the particular arrangement here shown an actuating member 87 is pivotally mounted on a block 88 by a pivot pin 89 and the block 88 is pivotally mounted in an upright supporting structure 90 by a pivot pin 91 which extends at substantially right angles to the pivot pin 89. The actuating member 87 includes parts arranged in operative relation to the actuating elements 81 of the respective valves. In the present instance the actuating member 87 is elongate in form and extends transversely to the axis 91. Cross bars 92 and 93 are secured to the respective ends of the member 87 and in effect form a part thereof, the cross bar 92 having its end portions supported above and in operative relation to the actuating elements 81 of the valves 79 and 85 and the cross bar 93 having its end portions arranged above and in operative relation to the actuating elements of the valves 80 and 86. Thus when the actuating device is moved about the axis 89 in one direction the adjacent ends of the bars 92 and 93 will respectively engage and operate the actuating elements of the valves 79 and 80 thereby admitting propellant fluid to the respective lifting units. If one lifting unit moves at a slower speed than the other, due to different loading or otherwise, the actuating member 87 is tilted about the axis 91 to move the bars 92 and 93 in opposite directions, while in engagement with the respective valves, to increase the flow of fluid to the slower moving lifting unit and, with the present arrangement, to decrease the flow of fluid to the faster moving lifting unit, thereby maintaining the vehicle on the lift substantially horizontal. When the vehicle has been elevated to the desired height the actuating device is returned to normal position thus permitting the valves to close and thereby provide a positive hydraulic lock to retain the lifting elements in their elevated positions. When the lift is to be lowered the actuating member 87 is moved about the axis 89 in the other direction to open the two valves 85 and 86 and permit the fluid to flow from the lifting units through the control mechanism back to the supply tank. If one unit moves at a greater speed than the other this can be corrected by manipulating the actuating device in the manner above set forth.

The actuating device may be operated from the exterior of the control box in any suitable manner. Preferably the top wall 75 of the control box is provided with an opening 93' above the actuating member 87 and the latter is provided with a socket 94 in line with the opening and adapted to receive an operating rod 95, or the like, which is inserted through the opening in the top wall into the socket, the opening being sufficiently large to permit the free movement of the rod in all operative directions. The rod is, of course, removable so that it will offer no interference with the use of the floor, and preferably the top and bottom walls of the control box are provided at one corner thereof with aligned openings 96 through which the rod may be inserted into a socket or space below the control box, not shown, a head 97 on the rod serving to limit its downward movement and to facilitate its withdrawal for use. It is also desirable that means should be provided to prevent dust or other foreign matter from entering the control box through the opening 93'. For this purpose a concavo-convex guide member 98 is slidably mounted upon the socket member 94 and is pressed upwardly against the edge of the opening 93' by a spring 99 confined between the guide and the top of the actuating member.

When an air pressure oil tank is used a slightly different arrangement of the control mechanism is necessary. With an oil tank of the type, shown at 100 in Fig. 2, air under pressure is introduced into the top of the tank through an air conduit 101 and the propellant fluid is discharged from the lower portion of the tank through a conduit 102 to the control mechanism in the control box. The control box 103 is similar to the control box 74 except that the top wall 104 thereof is provided both with a central opening 105 and with a second opening 106. The supply pipes 62a and 63a are connected with the lifting units in the same manner as are the conduits 62 and 63 and extend into the control box where they are connected with control valves (Figs. 12, 13 and 14). The air conduit 101 which leads to the fluid tank is connected within the control box with a valve 107 which is connected by a conduit 108 with a source of supply of air under pressure. The conduit 101 is also connected through a valve 109 with an exhaust pipe 110. Thus the opening of the valve 107 admits air to the tank and places the fluid therein under pressure. When the load on the lift is to be lowered the valve 109 is opened to exhaust the air from the tank and permit the fluid to flow from the lifting units back to the tank. The valves 107 and 109 are self-closing valves and each is provided with an actuating element 111. The air valve actuating device comprises a member 112 pivotally supported between its ends on a fixed axis and having parts 113 overhanging the respective valve actuating elements 111. The parts 113 extend upwardly from the end portions of the member 112 and are normally close to the cam shaped end portions 114 of an actuating member 115. This actuating member is pivotally supported on links 116 which are pivotally mounted for movement about the axis of the member 112. The actuating member 115 is provided with a socket 117 in line with the elongate opening 106 in the top wall of the box and adapted to receive an operating rod. When the actuating member is moved in one direction about its pivotal support the cam portion 114 at one end thereof moves the adjacent end portion 113 of the member 112 downwardly into engagement with the actuating element 111 of the air inlet valve 107 thus opening that valve. The cam end 114 of the member 115 rides over the rounded end of the projection 113 and due to the swinging movement of the member 115 on the links 116 the end 114 of the member 115 enters the recess formed between the part 113 and its supporting member 112, thus locking the valve 107 in its open position, the actuating device 115 being retained in this locking position until it is positively moved to a releasing position. The movement of the actuating member 115 in the opposite direction opens the exhaust valve 109 and locks it open.

The fluid supply pipe 102 leads from the tank 100 into the lower portion of the control box and the conduits 62a and 63a enter the control box on opposite sides of the conduit 102 and are connected with that conduit through self-closing gate valves 118 and 119 which are similar to valves 79 and 80 of Figs. 9 and 10. An actuating member 120 is pivotally mounted on a block 121 by a pivot pin 122 and the block is mounted by a pivot pin 123 on a supporting structure 124. The member 120 is provided at its end with arms 125 and 126 the free ends of which are arranged in operative relation to the actuating elements of the valves 118 and 119. When the actuating member 120 is moved clockwise about the axis 122, as shown in Fig. 14, both valves are opened. By moving the actuating member about the axis 123 while in valve opening position the flow of fluid through the valves may be adjusted in accordance with the loads on the valves. When the load is to be lowered the air exhaust valve for the tank is opened and the valves 118 and 119 are again opened, thus releasing the air from the tank and permitting the propellant fluid to flow back into the tank from the lifting units.

In Fig. 15 there is illustrated an application of the invention to a vehicle lift in which one of the lifting units is bodily movable toward and from the other lifting unit. As there shown the lift of the unit 127 comprises a cylinder 128 and an actuating element 129 having on its upper end an axle supporting element 130. The cylinder 128 and therefore the unit as a while is supported on a plate 131 which is slidably mounted on the floor 132 and constitutes a closure for the open end of a pit 133. The plate may be supported in any suitable manner and as here shown it is mounted on a carriage 134 which is provided at its ends with rollers 135 which travel in tracks 136 mounted on the side walls of the pit. The fluid supply conduit 137 is made extensible, as by providing it with pivoted sections 138.

The plate 131, and therefore the lifting unit 127 as a whole, may be adjusted lengthwise of the pit in any suitable manner. It is here shown as provided with a series of holes 139 through which an actuating rod may be inserted and engaged with another series of holes 140 in a fixed part of thee structure beneath the edge portion of the plate and the plate thus moved step by step.

The other lifting unit 141 is shown as a two post unit, is provided with an equalizing device and is substantially similar to the two post lifting unit above described. It is connected by a supply pipe 142 with a source of propellant fluid. Both supply pipes 142 and 137 extend to a control box 143 and the flow of propellant fluid through the same is controlled substantially in the manner above described.

While we have shown and described one embodiment of our invention and certain modifications thereof, we wish it to be understood that we do not desire to be limited to the details thereof as various modifications may occur to a person skilled in the art.

Having now fully described our invention what we claim as new and desire to secure by Letters Patent is:

1. An apparatus for controlling the flow of fluid through two separate conduits, including a valve in each conduit, each valve having an inlet and an outlet conduit separate from the inlet and outlet conduits of the other valve, and a valve actuating device mounted for movement in either of two directions and having means controlled by the movement thereof in one direction to open both of said valves and by the movement thereof in the other direction while said valves are open to control the relative flow of fluid through said valves.

2. An apparatus for controlling the flow of fluid through two separate conduits, including a valve in each conduit, each valve having an inlet and an outlet conduit separate from the inlet and outlet conduits of the other valve, and a valve actuating device mounted for movement in either of two directions and having means controlled by the movement thereof in one direction to open both of said valves and by the movement thereof in the other direction while said valves are open to control the relative flow of fluid through said valves, and a single member for moving said device in either of said directions.

3. An apparatus for controlling the flow of fluid through two separate conduits including a valve in each conduit, each valve having an inlet and an outlet conduit separate from the inlet and outlet conduits of the other valve, and a valve actuating device movable about either of two axes and having means controlled by the movement thereof about one of said axes to open both valves and controlled by the movement thereof about the other of said axes while said valves are open to control the relative flow of fluid through said valves.

4. An apparatus for controlling the flow of fluid from a source of fluid under pressure through separate conduits to two fluid operated devices, said apparatus comprising a self-closing valve in each of said conduits, each of said valves having an inlet and an outlet conduit separate from the inlet and outlet conduits of the other valve, each valve including an operating member for opening the same, a valve actuating device including two parts supported for movement into engagement with the respective valve operating members to open both valves and for relative movements while in engagement with said operating members to vary the relative flow of fluid through the two valves, and a single means for imparting said movements successively to said parts of said actuating device.

5. An apparatus for controlling the flow of fluid from a source of fluid under pressure through separate conduits to two fluid operated devices, said apparatus comprising a self-closing valve in each of said conduits, each valve including a pivotally mounted operating member for opening the same, a valve actuating device having parts to operatively engage the operating members of the respective valves, and means for moving said actuating device in one direction to move said parts thereof into engagement with said valve operating members and open both valves, and for moving said actuating device in another direction while both valves are open to vary the relative flow of fluid through the two valves.

6. An apparatus for controlling the flow of fluid from a source of fluid under pressure through separate conduits to two fluid operated devices, said apparatus comprising a self-closing valve in each of said conduits, each valve including a pivotally mounted operating member for opening the same, a valve actuating device having parts to operatively engage the operating members of the respective valves, and means for moving said actuating device in one direction to move said parts thereof into engagement with said valve operating members and open both valves, and for moving said actuating device in another direction while both valves are open to vary the relative flow of fluid through the two valves, said actuating device having means whereby an operating member may be detachably connected therewith to impart said movements thereto.

7. An apparatus for controlling the flow of fluid through two separate conduits, including a valve in each conduit, each valve having an inlet and an outlet conduit separate from the inlet and outlet conduits of the other valve, and a valve actuating device comprising a member mounted for movement about two axes in intersecting planes, and parts connected with said member for movement thereby in unison to open both valves when said member is moved about one of said axes and movable with relation one to the other by the movement of said member about the other of said axes while said parts are in valve opening positions to decrease the flow of fluid through one of said valves with relation to the flow of fluid through the other of said valves, and means for imparting said movements to said member.

8. An apparatus for controlling the flow of fluid from a source of fluid under pressure through separate conduits to two fluid operated devices, said apparatus comprising a self-closing valve in each of said conduits, each valve including a pivotally mounted operating member for opening the same, a valve actuating device including a structure mounted for movement about a fixed axis, an elongate member mounted on said structure for movement with relation thereto about an axis parallel with said elongate member and at substantially right angles to the first mentioned axis, and a bar supported on one end portion of said elongate member substantially parallel with the last mentioned axis and with its end portions in operative relation to the operating members of the respective valves, and means for moving said structure and said elongate member about their respective axes.

9. An apparatus for controlling the flow of fluid to and from two fluid operated devices, said apparatus including two inlet valves leading to the respective fluid operated devices and two exhaust valves leading from the respective fluid operated devices, each valve having an operating member, a structure mounted for movement about either of two axes extending transversely one to the other, two parts connected with said structure and movable thereby into operative engagement with the operating members of the respective inlet valves to open the same when said structure moves in one direction about one of said axes, and movable with relation one to the other while in valve opening positions to vary the relative flow of fluid through said valves when said structure moves about the other of said axes, two other parts connected with said structure and movable thereby into engagement with the operating members for the respective exhaust valves to open the same when said structure moves in the other direction about the first mentioned axis, and means for imparting said movements to said structure.

10. An apparatus for controlling the flow of fluid to and from two fluid operated devices, said apparatus including two inlet valves leading to the respective fluid operated devices and two exhaust valves leading from the respective fluid operated devices, each valve having an operating member, a valve actuating device comprising a member mounted for movement about either of two axes extending transversely one to the other, bars supported by said member on opposite sides of and in substantial parallelism with one of said axes and extending laterally beyond the other of said axes with their outer end portions in operative relation to the operating members of the respective valves, means for moving said member in one direction about one of said axes to open both inlet valves and for moving the same about the other of said axes while said valves are open to vary the relative flow of fluid through said valves, and for moving said member in the other direction about the first mentioned axis to open both exhaust valves.

11. An apparatus for controlling the flow of fluid to and from two fluid operated devices, said apparatus including two inlet valves leading to the respective fluid operated devices and two exhaust valves leading from the respective fluid operated devices, each valve having an operating member, a valve actuating device including a block mounted for movement about a fixed axis, an elongate member mounted on said block for movement with relation thereto about an axis parallel with said elongate member and at substantially right angles to the first mentioned axis, and bars supported on said elongate member on opposite sides of and substantially parallel with said first mentioned axis with the end portions of the respective bars in operative relation to the operating elements of said inlet and exhaust valves, and means for moving said valve actuating device about said axes.

12. An apparatus for controlling the flow of fluid to and from two fluid operated devices, said apparatus including two inlet valves leading to the respective fluid operated devices and two exhaust valves leading from the respective fluid operated devices, each valve having an operating member, a valve actuating device comprising a supporting member mounted for movement about two axes in intersecting planes, substantially parallel bars supported by said supporting member on opposite sides of one of said axes and extending through the plane of the other of said axes, the end portions of said bars on one side of the last mentioned axis being in operative relation to the operating members of the respective inlet valves, and the end portions of said bars on the other side of said last mentioned axis being in operative relation to the operating members of the exhaust valves, whereby the movement of said supporting member in one direction about said last mentioned axis will open both inlet valves and the movement thereof in the other direction about said last mentioned axis will open both exhaust valves, and the movement of said supporting member about the first mentioned axis while either pair of valves is open will vary the relative flow of fluid through the open valves.

13. A control mechanism for use in a multi-lift apparatus for lifting motor vehicles, said lift having load supporting elements movable through an opening in the floor, said load supporting elements being substantially flush with the top of the floor, said control mechanism including the combination of a casing mounted in the floor with the top thereof flush with the floor, with a plurality of conduits extending into the casing, a valve in each conduit, each of said valves having an inlet and an outlet conduit separate from the inlet and outlet conduits of the other valves, a valve actuating device mounted in the casing for movement in either of two directions and having means controlled by the movement thereof in one direction to open two of said valves and by the movement thereof in another direction while said valves are open to control the relative flow of fluid through said valves, and an operating rod for controlling said valve actuating device, said operating rod extending through the opening in the top of the casing so as to extend above the level of the floor.

References Cited in the file of this patent

UNITED STATES PATENTS

| Number | Name | Date |
| --- | --- | --- |
| 1,486,304 | Ross | Mar. 17, 1924 |
| 1,541,712 | Horn | June 9, 1925 |
| 1,903,887 | Widener | Apr. 18, 1933 |
| 1,962,924 | Bristol | June 21, 1934 |
| 2,015,357 | Weaver | Sept. 24, 1935 |
| 2,057,335 | Hott | Oct. 13, 1936 |
| 2,120,051 | Tully | June 7, 1938 |
| 2,158,399 | Carter | May 16, 1939 |
| 2,165,095 | Frechette | July 4, 1939 |
| 2,224,725 | Felt, Jr. | Dec. 10, 1940 |
| 2,250,965 | Pritz | July 29, 1941 |
| 2,336,715 | Casler et al. | Dec. 14, 1943 |
| 2,358,634 | Good | Sept. 19, 1944 |
| 2,366,883 | Tydon | Jan. 9, 1945 |
| 2,381,664 | Hansen | Aug. 7, 1945 |
| 2,424,673 | Thompson | July 29, 1947 |
| 2,443,405 | Thompson | June 15, 1948 |
| 2,464,731 | Thompson | Mar. 15, 1949 |
| 2,497,558 | Reeves | Feb. 14, 1950 |
| 2,524,237 | Smith | Oct. 3, 1950 |